United States Patent
Chang

(10) Patent No.: US 6,715,887 B2
(45) Date of Patent: Apr. 6, 2004

(54) COLOR WHEEL MODULE FOR IMAGE DISPLAY DEVICE

(75) Inventor: Sean Chang, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 95 days.

(21) Appl. No.: 10/303,032

(22) Filed: Nov. 25, 2002

(65) Prior Publication Data

US 2004/0046945 A1 Mar. 11, 2004

(30) Foreign Application Priority Data

Sep. 11, 2002 (TW) .................................... 91214294 U

(51) Int. Cl.$^7$ .......................... G03B 21/14; G02B 5/22; H04N 9/12
(52) U.S. Cl. .................. 353/84; 348/743; 359/889; 359/891
(58) Field of Search .................. 353/84; 348/743, 348/742, 836; 359/578, 580, 889, 891, 892

(56) References Cited

U.S. PATENT DOCUMENTS

| | | | |
|---|---|---|---|
| 5,868,482 A | | 2/1999 | Edlinger et al. |
| 5,980,076 A | * | 11/1999 | Dunn et al. ............... 362/562 |
| 6,011,662 A | * | 1/2000 | Evans ....................... 359/891 |
| 6,024,453 A | | 2/2000 | Edlinger et al. |
| 6,504,598 B2 | * | 1/2003 | Kitano ...................... 355/71 |
| 2002/0003704 A1 | * | 1/2002 | Ohmae et al. ............ 362/293 |

* cited by examiner

*Primary Examiner*—Russell Adams
*Assistant Examiner*—Michael Dalakis
(74) *Attorney, Agent, or Firm*—Birch, Stewart, Kolasch & Birch, LLP

(57) ABSTRACT

A color wheel module for an image display device prevents the motor from being damaged during balancing processes. The color wheel module includes a spindle, a motor, a carrier, a connection ring and a color wheel. The motor drives the spindle to rotate. The carrier is mounted onto the spindle and is driven by the spindle for rotation. The color wheel includes a plurality of color filters bonded onto the connection ring, and then the bonded color filters and the connection ring are mounted onto the carrier. Thus balancing of the color wheel may be done before it is mounted on the carrier to avoid damaging the spindle and the motor resulting from adding or removing substance during the balancing process.

14 Claims, 6 Drawing Sheets

COLOR WHEEL MODULE FOR IMAGE DISPLAY DEVICE

FIELD OF THE INVENTION

The invention relates to a color wheel module for an image display device to modulate the color of light beams, and more particularly, to a color wheel module capable of preventing the spindle of the color wheel from being damaged during a balance process.

BACKGROUND OF THE INVENTION

Image display devices are used to project image on a screen for viewing. A conventional image display device mainly includes an image generation device to generate various types of images. It needs a light beam that changes color at a high frequency to generate the color images. Conventional image display devices generally employ a color wheel to achieve this purpose.

The color wheel consists of a plurality of color filter sheets with different optical spectrum. Light beams passing through the filter sheets are filtered. Only certain spectrum of light is allowed to pass through and other spectrum of light will be reflected. By rotating the color wheel continuously, different color filter sheets are sequentially insert into the path of the light beam to provide sequential color change of the light beam at a high frequency. As the color wheel provides sequential color change of the light beam through rotation, the color filter sheet is usually designed in a fan shape for adhering to a carrier to form the color wheel. Then the color wheel is mounted onto a spindle of a motor.

There are many ways for mounting the color wheel known in the prior art, such as U.S. Pat. Nos. 5,868,482 and 6,024,453. Refer to FIG. 1 for a conventional color wheel. It has a carrier 11 coated with an adhesive layer 13 to bond to a color wheel 17 for mounting onto a spindle 22 of a motor 2. As the color wheel 17 requires high precision, balancing must be done after bonding to ensure that the color wheel 17 is not positioned eccentrically or does not wobble when rotating (to meet the quality requirements to conform to ISO G 6.3 of 1940 to 1973). However, in the conventional structures balancing is done only after the carrier 11 and the color wheel 17 have been mounted onto the spindle 22 of the motor 2. The most common approach for balancing is to have test rotation for the color wheel 17. A small amount of a substance is then filled into or removed from the unbalanced side. Either way, the color wheel 17 has already been mounted onto the spindle 22. The balancing process tends to apply some unwanted force on the motor 2 which may damage the spindle 22 of the motor 2. Take the example of removing the substance. A selected amount of substance has to be removed from the heavier side of the color wheel 17 to reach the desired balance. The most common way to remove the substance is drilling. Hence during the drilling process of removing the substance, the spindle 22 of motor 2 is subjected to stress and damage might occur. It could even result in reduced the life of the motor 2. Moreover, balancing is done after the color wheel 17 has been mounted onto the spindle 22. Because of the balancing process is done after the color wheel been junction together with the spindle 22 of the motor 2. Once the color wheel 17 is damaged and a new color wheel 17 is replaced, the balancing process has to be redone. In serious situations, if the balance process has caused damage or bias on the spindle 22, a great amount of effort must be devoted to make the new color wheel 17 reach the balance required. Sometimes balance can never be achieved, and the color wheel module 30 becomes useless.

SUMMARY OF THE INVENTION

The primary object of the present invention is to provide a color wheel module for an image display device to resolve the foregoing problems. The color wheel module is composed of a color wheel and a motor assembly. The color wheel is balanced before it is mounted with the spindle of the motor to prevent causing stress and damage to the spindle of the motor.

The color wheel module for an image display device according to the invention is adopted for use on an image display device to modulate the color of light beams. It consists of a spindle, a motor, a carrier, a color wheel and a connection ring. The spindle is mounted in the motor and driven by the motor for rotation. The carrier is coupled on the spindle and has a contact flange and a support section to form a trough therebetween. The connection ring is bonded to the color wheel. After the connection ring is bonded with the color wheel, balance may be performed. There is no restriction on the balance method. Substance may be removed by rotation methods. After balanced, the connection ring is installed in the base circle of the carrier. By controlling the precision diameter of the base circle, balance is no longer necessary when the color wheel is mounted onto the carrier. Thus the damage or bias of the spindle that might otherwise occur during the balance process is eliminated.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
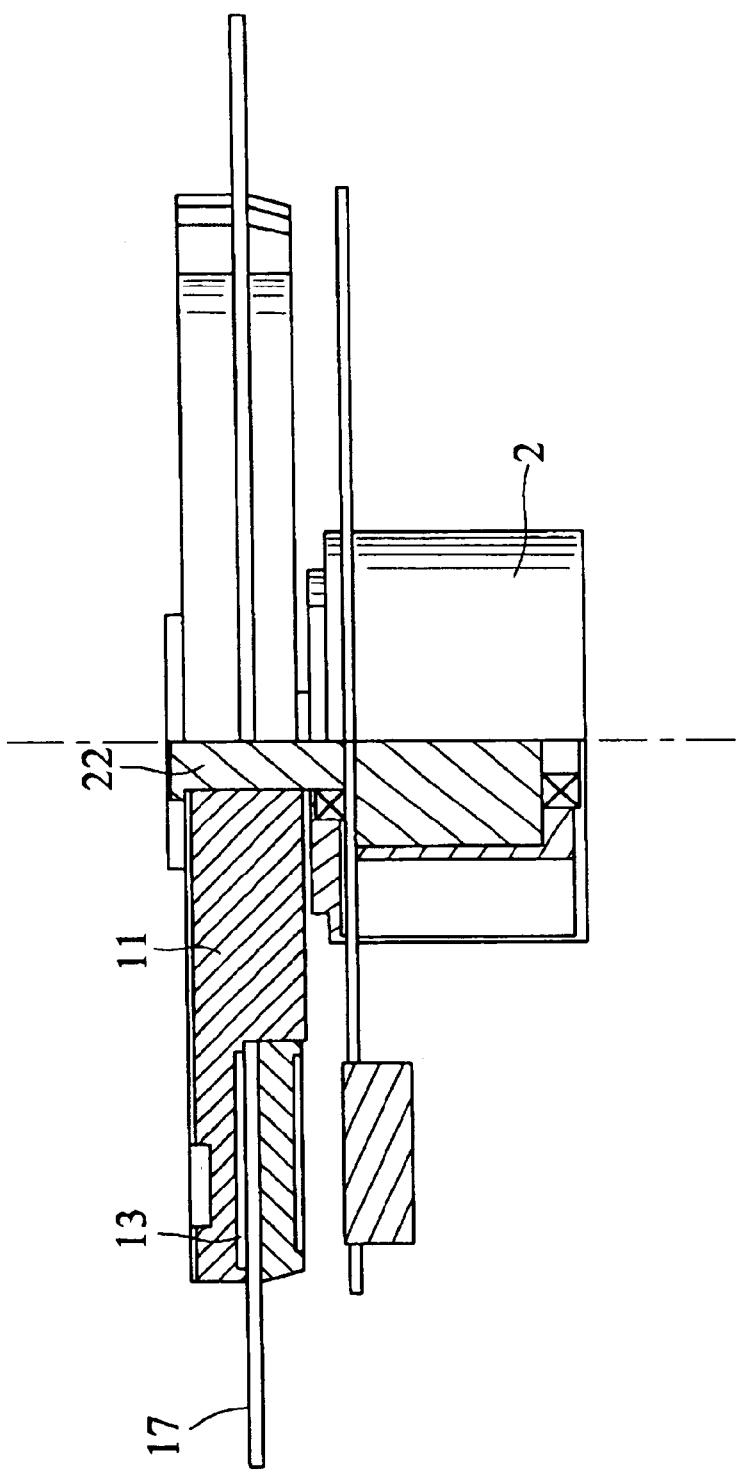
FIG. 1 is a schematic view of a conventional color wheel module.
Figure 2:
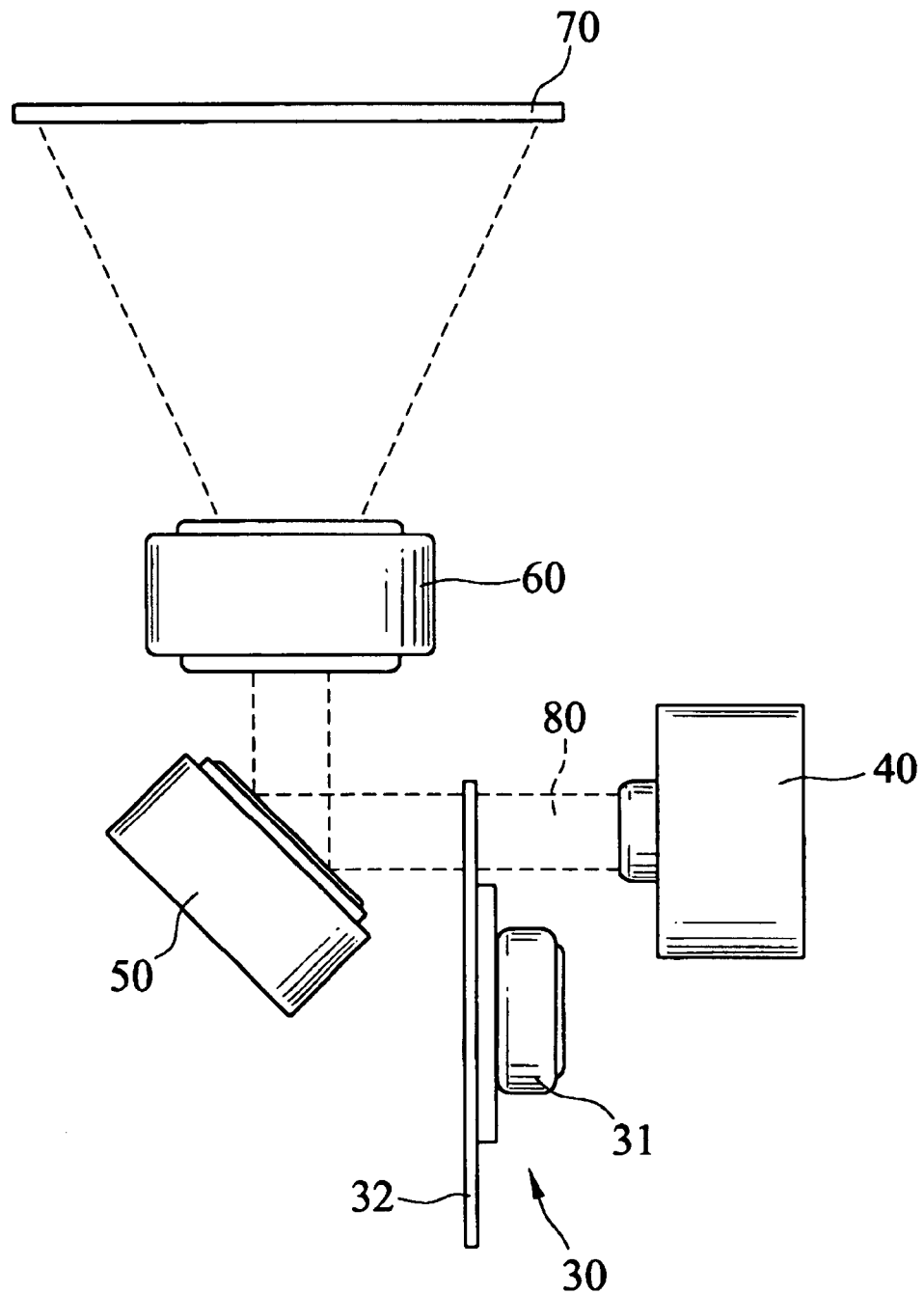
FIG. 2 is a schematic view of the color wheel module of the invention adopted for use on an image display device.

Referring to FIG. 2, the color wheel module 30 of the invention is adopted for use on an image display device. The image display device, in addition to the color wheel module 30, also includes a light source system 40, an image generation device 50 and an optical projection system 60. The color wheel module 30 can modulate light beams 80 emitted from the light source system 40 to output sequential color light beams. Then the colored light beams are projected on a screen 70 through the image generation device 50 and the optical projection system 60.

Figure 3:
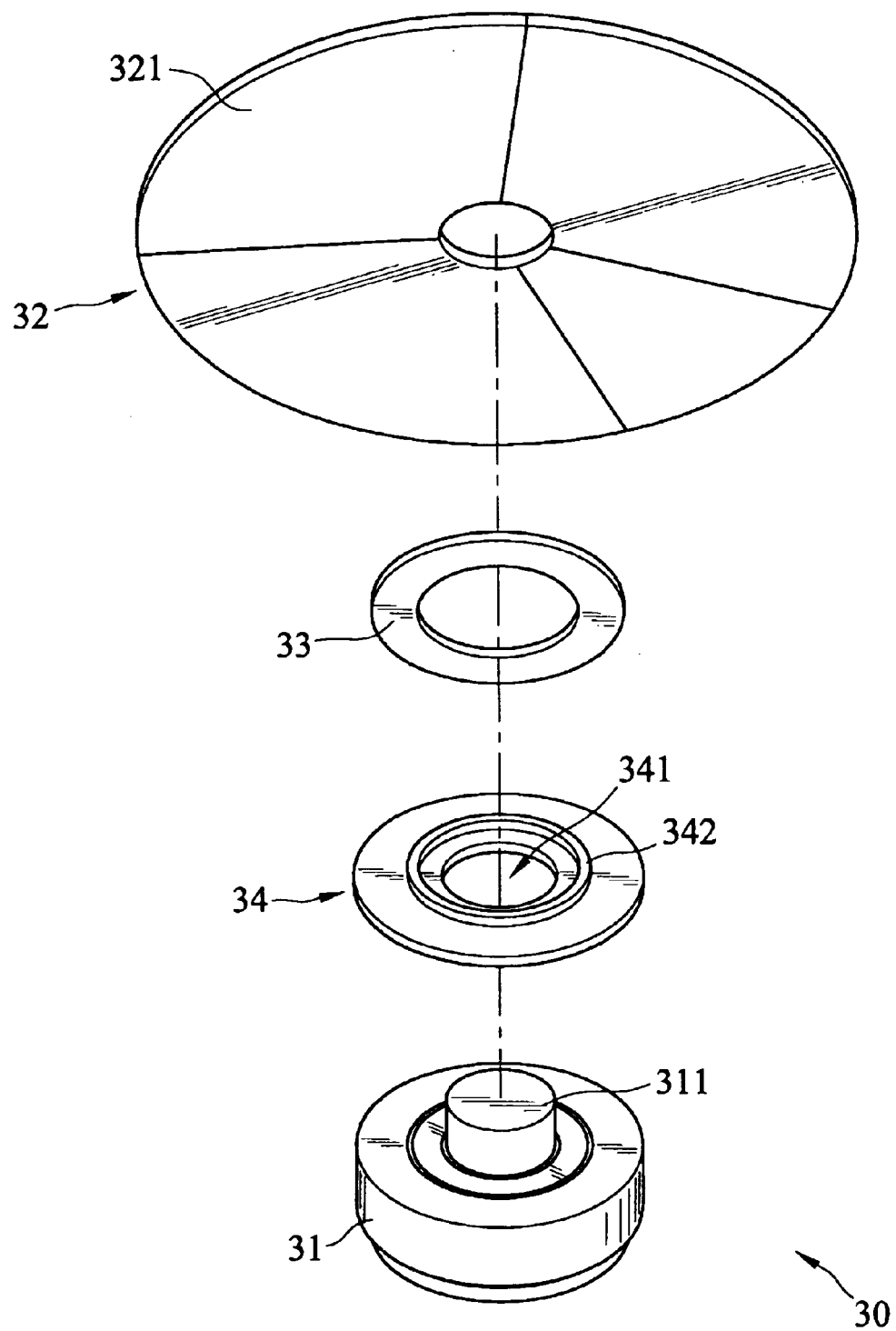
FIG. 3 is an exploded view of a first embodiment of the color wheel module of the invention.
Figure 5:
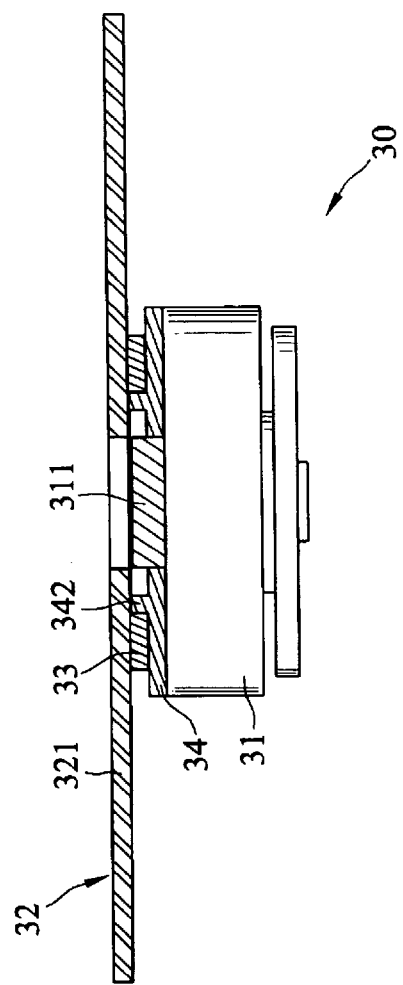
FIG. 5 is a side view of the first embodiment of the color wheel module according to FIG. 3, partly cutaway.
Figure 4:
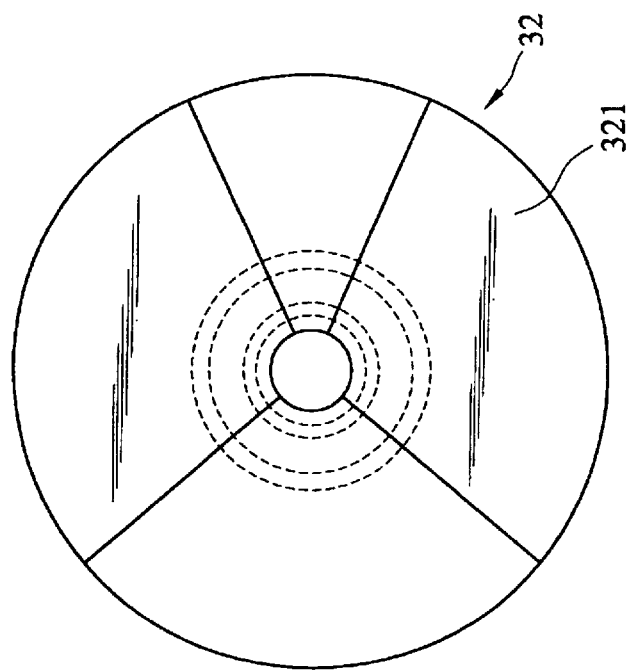
FIG. 4 is a top view of the color wheel according to FIG. 3.

Refer to FIGS. 3, 4 and 5 for a first embodiment of the invention. The color wheel module 30 consists of a motor 31, a spindle 311, a carrier 34, a connection ring 33 and a color wheel 32. The motor 31 drives the spindle 311 to rotate. The carrier 34 is a circular disk and includes a vertical round opening 341 formed in a cylindrical shape, and a contact flange 342. The round opening 341 is located in the center of the carrier 34 for mounting with the spindle 311 so that the carrier 34 may be tightly coupled on the spindle 311 in a symmetrical manner to rotate when driven by the motor 31. In addition, the contact flange 342 is formed in an annular shape and located on an outer side of the center portion of the carrier 34.

In this embodiment, the connection ring 33 is bonded with color filters 321 of the color wheel 32. The connection ring 33 is located on the outside of the contact flange 342. The connection ring 33 has a vertical inner opening circular surface with a diameter equal to the vertical outer circular surface rim diameter of the contact flange 342. Therefore, the color wheel 32 can be mounted with the carrier. 34 on the same rotation axis. The color wheel 32 is composed of transparent color filters 321 formed by different optical films (as shown in FIG. 4) to enable the passing light beams to be modulated to sequential color light beams. The color filters 321 include the colors of red, green, blue and white. Each filter film is formed in a fan shape and is coupled with connection ring 33 to form the circular color wheel 32.

After the color filters 321 of the color wheel 32 are bonded to the connection ring 33, balancing may be performed. There are many ways to do the balancing. The most commonly used method is to rotate the color wheel 32 and detect the vibration amount and the angular position of the unbalance mass, then to add or remove substance. Of course this method is by no means the only one possible. Other balance methods may be employed as desired. Once balancing is finished, couple the vertical circular surface of the inner opening of the connection ring 33 with the vertical outer circular surface rim of the contact flange 342 to mount the connection ring 33 onto the carrier 34. Then the motor 31 may drive and rotate the color wheel to alternately modulate the color of the light beams 80. The coupling between the inner vertical circular surface of the connection ring 33 and the outer vertical circular surface rim of the contact flange 342 of the carrier 34 is relatively easy because their matching precision is easier to control and achieve by existing machining techniques. Once balancing is completed beforehand for the connection ring 33 and the color wheel 32, they may be mounted onto the carrier 34 without doing balancing again. Hence the process of balancing will not apply the unwanted force to the spindle 311 of the motor 31, and damage to the spindle 311 and the motor 31 may be prevented.

Figure 6:
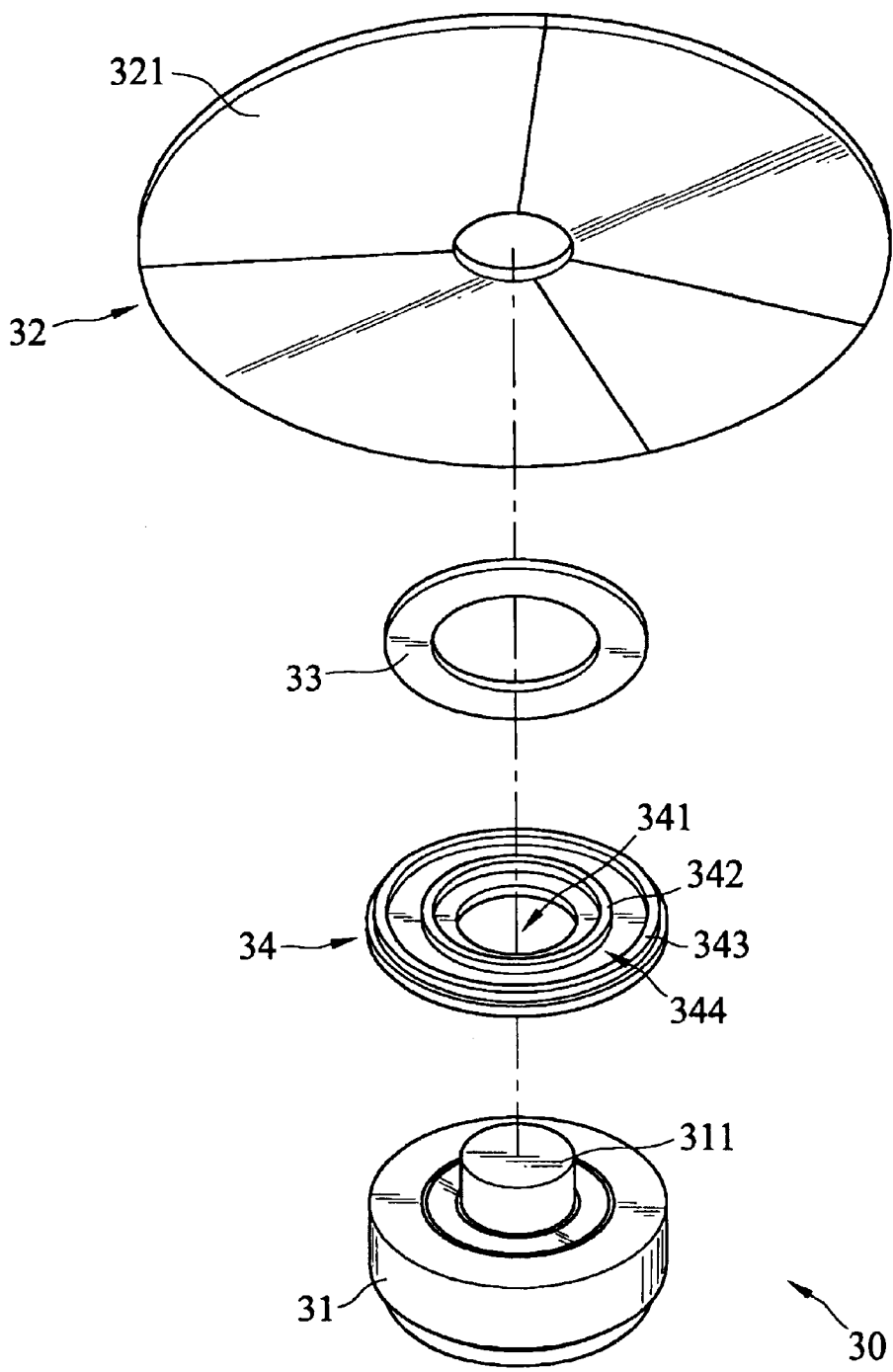
FIG. 6 is an exploded view of a second embodiment of the color wheel module of the invention.
Figure 7:
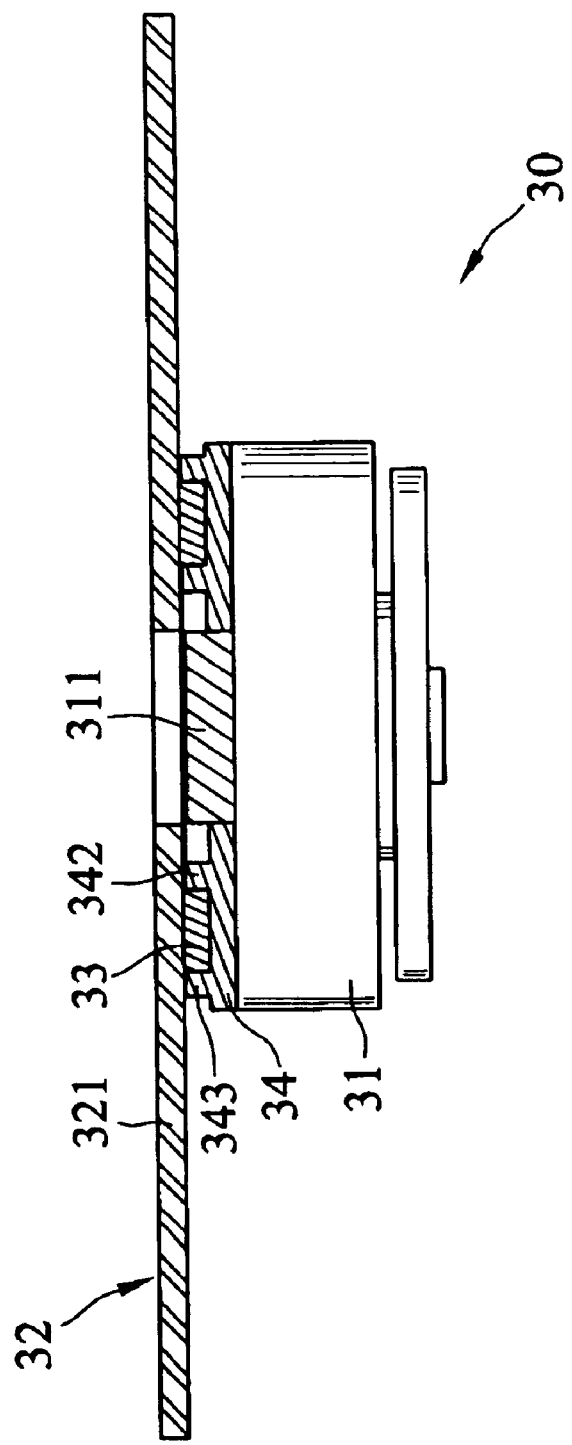
FIG. 7 is a side view of the second embodiment of the color wheel module according to FIG. 6, partly cutaway.

Refer to FIGS. 6 and 7 for a second embodiment of the present invention. A contact flange 343 is added on the carrier 34 and there is a vertical inner circular surface on the contact flange 343. The connection ring 33 of the color wheel 32 has a vertical outer circular surface and the diameter is equal to the vertical inner circular surface on the contact flange 343. Therefore, the color wheel 32 can be mounted with the carrier 34 on the same rotation axis.

Also there is another possibility, the color wheel 32 can be mounted to the shaft directly. Furthermore, the connection ring 33 has an inner vertical circular surface that can be direct mounted to the outer diameter circular surface of the shaft.

In summary, the color wheel module for an image display device of the invention adopts the approach of bonding the color wheel to the connection ring, then performing balancing. The vertical circular surface of the connection ring and the vertical circular surface of the carrier are precisely controlled to enable the color wheel to be mounted onto the spindle without additional balancing processes. There is no need for adding or removing substance to do the balancing after the color wheel module is assembled. Thus, damage to the spindle and the motor may be prevented.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A color wheel module for modulating the color of an external incident light beam, comprising:
 a spindle;
 a motor for driving the spindle to rotate;
 a carrier formed in a circular disk comprising:
  a cylindrical and vertical circular surface opening formed in the center of the carrier to bind with the spindle such that the carrier is tightly coupled on the spindle for rotation when driven by the motor; and
  an annular contact flange with vertical circular surface located on the periphery of the carrier outside the center portion thereof;
 means for connecting first to the color wheel and then to the contact flange of the carrier so that balancing of the color wheel and the means for connecting can initially be carried out before being connected to the carrier, the means for connecting including a connection ring attachable on an outer rim of the contact flange and having an inner vertical circular surface opening which has a diameter generally equal to a diameter of the outer vertical circular surface rim of the contact flange; and
 a color wheel composed of transparent color filter films formed by different optical films, the color wheel being drivable to rotate to alternately modulate the color of the incident light beam;
 wherein after the color wheel is bonded to the connection ring for balance, the color wheel is coupled to the contact flange of the carrier to be driven by the spindle to be rotatable in a balanced manner.

2. The color wheel module of claim 1, wherein the inner vertical circular surface opening of the connection ring and the outer vertical circular surface of the contact flange are of uniform diameter and are uninterrupted.

3. The color wheel module of claim 2, wherein the balance method of the color wheel module is to selectively perform by adding or removing substance.

4. The color wheel module of claim 1, wherein the color filter films include at least filter films of red, green and blue colors.

5. A color wheel module for modulating the color of an external incident light beam, comprising:
 a spindle; and
 a motor for driving the spindle to rotate;
 a carrier formed in a circular disk comprising:
  a cylindrical and vertical circular surface opening formed in the center thereof to bind with the spindle such that the carrier is tightly coupled on the spindle for rotation when driven by the motor; and
  an annular contact flange with vertical circular surface located on the periphery of the carrier outside the center portion thereof:

a connection ring having an outer vertical circular surface which has a diameter generally equal to a diameter of the inner vertical circular surface rim of the contact flange and the outer vertical circular surface of the contact ring being in abutment with the inner vertical circular surface rim of the contact flange; and a color wheel composed of transparent color filter films formed by different optical films, the colored wheel being drivable to rotate to alternately modulate the color of the incident light beam;

wherein the color wheel is bonded to the connection ring for balance, then coupled to the contact flange of the carrier to be driven by the spindle to be rotatable in a balanced manner.

6. The color wheel module of claim 5, wherein the carrier has a second annular contact flange which is engagable with the color wheel.

7. The color wheel nodule of claim 6, wherein the balance method of the color wheel module is to selectively perform by adding or removing substance.

8. The color wheel module of claim 5, wherein the color filter films include at least filter films of red, green and blue colors.

9. A color wheel module for modulating the color of an external incident light beam, comprising:

a spindle;

a motor for driving the spindle to rotate;

a connection ring coupled on an outer circular surface of the spindle having an inner vertical circular surface opening which has a diameter generally equal to a diameter of the outer circular surface of the spindle; and a color wheel composed of transparent color filter films formed by different optical films, the color wheel being drivable to rotate to alternately modulate the color of the incident light beam, the color wheel being first bonded to the connection ring or balance, then coupled to the outer circular surface of the spindle to be driven by the spindle to be rotatable in a balanced manner.

10. The color wheel module of claim 9, wherein the diameter of the inner vertical circular surface opening of the connection ring is equal to the outer diameter of the vertical circular surface of the spindle.

11. The color wheel module of claim 10, wherein the balance method of the color wheel is to selectively perform by adding or removing substance.

12. The color wheel module of claim 9, wherein the color filter films include at least filter films of red, green and blue colors.

13. The color wheel module of claim 6, wherein outer circular surfaces of both of the annular contact flanges of the carrier are of a uniform diameter and are uninterrupted and wherein an inner vertical circular surface opening of the connection ring is of a uniform diameter and is uninterrupted.

14. The color wheel module of claim 9, wherein the inner vertical surface opening of the connection ring is of a uniform constant diameter.

* * * * *